United States Patent Office 3,606,101
Patented Sept. 20, 1971

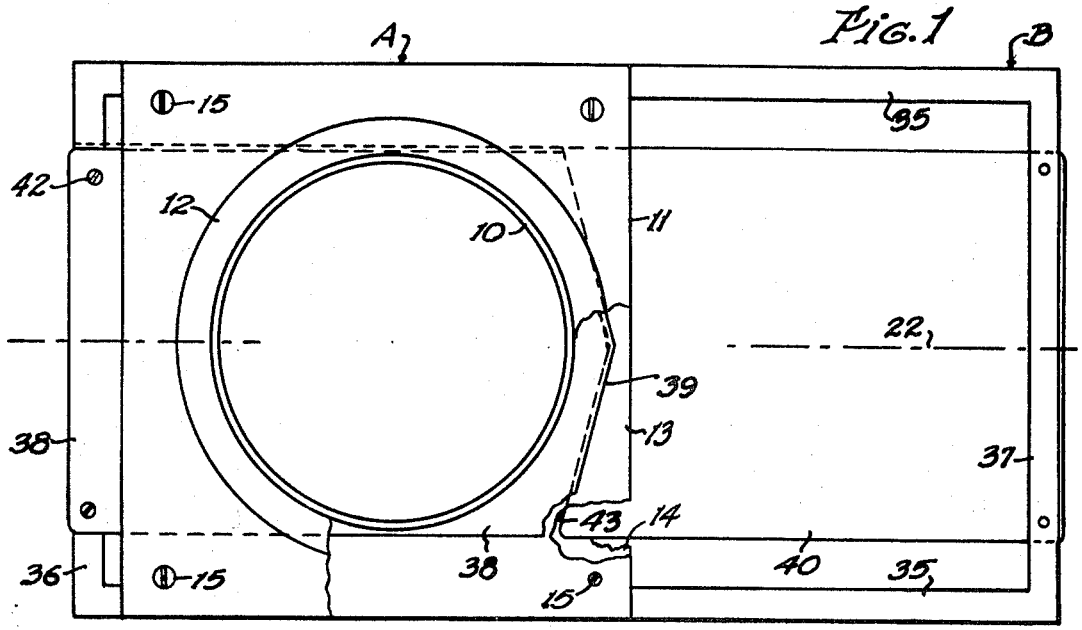
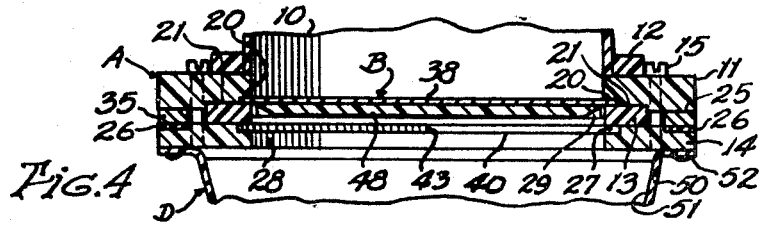
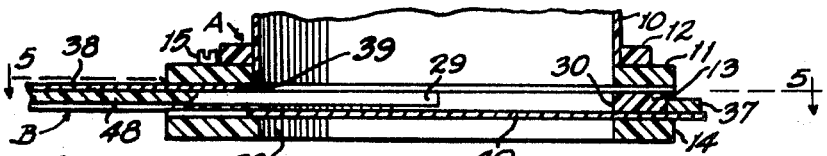
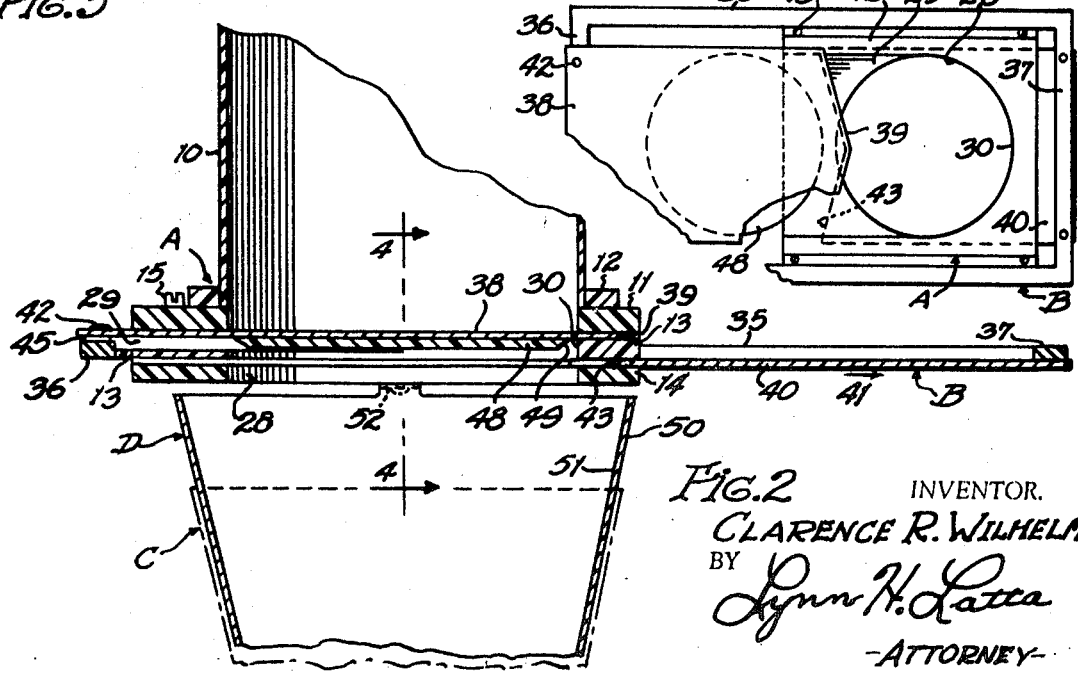

3,606,101
APPARATUS FOR DISPENSING CLINGING SUBSTANCES SUCH AS SHAVED ICE AND THE LIKE INTO RECEPTACLES
Clarence R. Wilhelmi, 2203 Midvale Ave.,
Los Angeles, Calif. 90064
Filed Jan. 2, 1969, Ser. No. 788,519
Int. Cl. G01f 11/28
U.S. Cl. 222—447                                10 Claims

ABSTRACT OF THE DISCLOSURE

A dispenser for substances such as flaked ice which tends to cling to the dispenser surfaces, wherein a cutter blade and support plate, moving in unison in vertically spaced planes, are operable to remove a measured quantity of the substance from the bottom of a column thereof in a hopper, and to dispense it through a delivery funnel with a positive stripping action.

BACKGROUND OF THE INVENTION

An ice dispenser having a hopper and a dispensing slide is disclosed in Pat. No. 2,237,189, McCormack et al. Dispensers for non-flowing material such as butter, fed downwardly in a hopper and sliced off at its lower end by a rotary dispensing device, is shown in Portwood Pat. No. 2,228,974, and Palazzolo Pat. No. 2,663,932. Linear slide dispensers for other materials are disclosed in McLellan No. 922,315; Lundin 1,067,994 and Zint No. 2,642,878.

SUMMARY OF THE INVENTION

The dispenser of my invention has a cut-off blade or gate for severing a measured quantity of material from a column thereof in a hopper, and a receiving plate on which the material is deposited during a dispensing stroke and from which the severed quantity is discharged during such dispensing stroke, an important feature being the provision of means to positively strip the material from the receiving plate and to deflect it downwardly into a receptacle.

OBJECTS OF THE INVENTION

The general object of the invention is to provide a measuring dispenser particularly adapted for handling clinging materials such as shaved ice (e.g. for snow cones) and other particulate materials which do not flow freely by gravity. Specific objects are to provide such a dispenser which is:

(1) Operative to positively eject a measured quantity of material into a receptacle;

(2) Operative to continue the ejection until substantially the last remaining portion of the measured material is cleared away from the receiving plate and the dispensing throat of the apparatus;

(3) Readily convertible for dispensing different quantities of material.

These and other objects will become apparent in the ensuing specification and appended drawing, in which:

FIG. 1 is a plan view of a dispenser embodying the invention, with parts broken away;

FIG. 2 is a fragmentary sectional view thereof taken in the medial vertical plane of the dispensing slide and the major axis of the dispenser, the slide being shown in a position at the end of a dispensing stroke;

FIG. 3 is a fragmentary sectional view in the same plane, with the slide at the end of the hopper-opening stroke;

FIG. 4 is a transverse vertical sectional view taken on line 4—4 of FIG. 2; and

FIG. 5 is a fragmentary horizontal sectional view taken on line 5—5 of FIG. 3.

DESCRIPTION

Referring now to the drawing in detail, I have shown therein, as an example of one form in which the invention can be embodied, a snow-cone ice dispenser comprising, in general, a hopper and dispensing throat assembly A; a dispensing slide B, and a delivery funnel D for directing a dispensed quantity of shaved ice into a snow cone C.

Hopper-throat assembly A comprises a tubular hopper 10 which, as shown, can be cylindrical; a top plate 11 to which hopper 10 is secured by a flange 12; a center plate 13; a bottom plate 14; and a plurality of fasteners 15 (e.g. screws or bolts) securing the three plates together in a sandwich assembly, with center plate 13 clamped between plates 11 and 4. By loosening fasteners 15 and spreading plates 11 and 14, center plate 13 can be removed and replaced by a center plate of different thickness for varying the quantity of material that is dispensed, as more fully described hereinafter. Thus center plate 13 functions as a measuring plate.

Top plate 11 has a stepped under face defining a pair of slideways 20 (FIG. 4) and a pair of shallow rectangular locating recesses 21, all extending the full length of the sandwich assembly and having outer margins defined by shoulders extending parallel to the longitudinal slide axis (FIG. 1). The horizontal under faces of recesses 21 are engaged against the upper face of center plate 30 along its side margins (FIG. 4) so as to determine the slide clearance between center plate 13 and the under faces of slideways 20 which remains the same for each center plate of selected thickness (for selected quantity of dispensing operation) which may be installed.

The under faces of the outer portions of top plate 11, which are the lowest of the several stepped faces, are spaced above the bottom plate 14 to define a pair of slideways 25 for slide B. The opposed surfaces of bottom plate 14 are faced with bearing strips 26 of low friction material such as Teflon (tetrafluoroethylene) which are adhesively attached. When a change is made to a center plate of different thickness the top plate 11 is correspondingly raised and similar bearing strips of corresponding thickness, are attached to the under faces of top plate 11 at 25 to maintain the spacing between the slideway surfaces unchanged. Along the inner margins of bottom plate 14, in the upper face thereof, are shallow slideways 27 which are closed by center plate 13.

The plates 11, 13 and 14 are provided with respective circular openings of substantially the same diameter as the internal diameter of hopper tube 10, and which collectively define a throat 28. Center plate 13 (FIG. 5) has in its upper face a shallow, flat, rectangular depression 29 defined between lateral shoulders which extend tangently from the throat opening in plate 13 to the opposite end of plate 13. The semi-circular wall of this throat opening, tangent to the sides of depression 29, provides a stripping lip 30.

Hopper 10 is mounted so as to be positioned vertically, thereby to minimize adherence of the column of shaved ice therein to its inner surface. It is preferably transparent, so that its contents may be fully viewed, and may be of plastic material.

Slide B comprises a rectangular frame composed of longitudinal slide bars 35 slidably mounted in slideways 26, end cross bars 36 and 37, a cut-off blade 38, preferably of stainless steel or equivalent, having a chisel edge 39 of broad obtuse angular planform, and a support plate 40 disposed in a plane spaced below the cut-off blade 38. The blade 38 is attached by removable fasteners (e.g. screws) 42 to the cross-bar 36 of the slide frame above the plane thereof, and projects toward the opposite end, in the direction of the dispensing stroke which is indicated by arrow 41 in FIG. 2. The side margins of blade 38 are slidably mounted in ways 20. The support plate 40 is attached to the underside of cross bar 37 and projects toward cut-off blade 38 in a plane spaced below the same. Its forward end has a broad obtuse-angular notch 43 the edges of which are parallel to the chisel edge 39 and slightly underlap the same. The side margins of support plate 40 are slidably mounted in ways 27. The vertical spacing between blades 38 and 40 is determined by the thickness of center plate 13. The one shown may be taken as one of minimum thickness, for minimum dispensing volume. When a thicker plate 13 is substituted, a corresponding adjustment of cut-off blade 38 upwardly from frame cross bar 36 is made by removing screws 42 from its anchored end, inserting washer shims 45 of appropriate thickness between plate 38 and bar 36, and reinserting the screws.

Secured to the under face of cut-off blade 38 is a deflector pad 48 (of circular disc form where hopper 10 is cylindrical) having an edge bevel 49 of 30° inclination. The major diameter of disc 48 is approximately the same as that of throat 29. At the end of the dispensing stroke 41, the perimeter of disc 41 will be substantially in contact with stripping lip 30, and such contact may be utilized as a stop to determine the limit of the dispensing stroke. Depression 29 in center plate 13 accommodates the sliding movements of disc 48.

Delivery funnel D comprises a body 50 of any suitable material, e.g. plastic, and a release coating 51 lining its inner surface to minimize adherence of shaved ice passing downwardly into cone C. Coating 51 is preferably of Teflon or equivalent low-friction material.

To further avoid adherence of ice particles to the inner surface of funnel D the sides thereof have an inclination from the vertical which does not exceed 20°.

Funnel D is mounted to the underside of bottom plate 14 by suitable means such as diametrically-opposed integral ears 52 projecting radially outwardly from the rim of the funnel and attached by suitable fasteners (FIG. 4).

OPERATION

To load the dispenser, the hopper tube 10 is filled with shaved ice or other granular material which, if the slide B is in the position shown in FIG. 3, comes to rest against the support plate 40. A measured portion of the material may then be dispensed by shifting the slide B to its opposite limit position shown in FIG. 2 in a dispensing stroke indicated by arrow 41. At the beginning of this stroke (FIG. 3) the point of its cutting edge 39 is withdrawn just outside the periphery of throat 29. As the slide commences the dispensing stroke, the blade 38 will execute a cutoff stroke in which its cutting edge will enter throat 29 and slice through the lower end of the column of cracked ice projecting into the throat opening of measuring plate 13, severing the disc-like volume of ice within this opening from the column of ice above, which will be supported on the upper face of blade 38 as the latter slices through the column. The severed ice particles below the blade 38 will then drop through the lower area of throat 28, which is gradually opened by receding movement of the notched end 43 of support plate 40 in unison with the advancing movement of cutting edge 39 of blade 38.

As blade 38 advances in its cut-off stroke, the ice in the lower end of the ice column projecting into the throat opening of measuring plate 13 will be restrained by stripping lip 30 against any tendency to be pushed laterally by the advancing blade 38. The severed ice beneath the blade 38 will tend to adhere to the under surface of the blade due to the adhesiveness of its entrained moisture, but any tendency of this adhering ice to move laterally with the blade will only cause it to pile up against the unsevered portion of the lower end of the ice column, and this will loosen the ice particles so that they will drop through the open area of throat 29.

As the deflector plate 48 moves into throat 29, its bevelled edge 49, on its advancing side, will deflect downwardly any portion of the severed disc of ice particles tending to remain in fixed position in the throat opening of measuring plate 13, further loosening the ice particles from their massed condition. Thus the ice particles will be progressively dropped through the progressively opening throat into funnel D as fast as they are severed from the ice column, in unison with the advancing movement of cut-off blade 38.

As the slide B nears the end of its dispensing stroke 41, the bevelled edge 49 of deflector disc 48 on its advancing side will move into contact with the stripping lip 30 which in the meantime will have stripped from the under face of blade 38 projecting beyond the disc 48, any ice clinging to such under face, throughout the 180° extent thereof on the advancing side of the disc, also all ice clinging to the upper face of plate 40. As the bevelled edge 49 contacts the lip 30 (throughout its 180° extent) it will exert a wedging, prying action against any remaining arc of ice particles abutted against the lip 30, and will dislodge the same downwardly so as to complete the delivery of the entire measured volume of severed ice particles into the funnel D and thence into the receiving cone C.

The slide is then moved back to its FIG. 3 position. This position is determined by stop-engagement of slide frame cross bar 37 against the opposed end of center plate 13. This uncovers the throat opening in upper plate 11 and the column of shaved ice in tube 10 will consequently drop down onto support plate 40, then in a position closing the throat 29 below the level of center plate 13. The shaved ice will then fill the throat opening in center plate 13 to a depth corresponding to the thickness of plate 13. The latter therefore functions as a measuring plate, its thickness determining the measured volume that is dispensed.

The invention provides for a progressive, gradual dropping of the severed ice particles into funnel D, avoiding any dropping of the severed ice in a large chunk which could plug the outlet of funnel D.

For changing the dispensing volume, screws 15 are loosened sufficiently to allow substantial spreading of plates 12 and 14 which are then separated at their ends facing frame cross bar 37 (with the frame in the position shown in FIG. 2) and the measuring plate 13 is then slid out of the sandwich assembly toward cross bar 37, tilted upwardly to clear the same, and then slid the rest of the way out of the sandwich.

A new measuring plate 13 of selected thickness is then inserted by a reverse procedure and clamped in assembly by tightening the screws 15.

I claim:

1. In a dispenser for granular material of a clinging nature;

a tubular hopper for storage of the material;

means defining a dispensing throat and upper and lower and intermediate slide ways, and including means between said upper and lower ways providing a transversely extending stripping lip defining an intermediate portion of said throat at one extremity thereof along the slide axis of said ways; and a slide including a slide frame slidable in said intermediate ways, a cut-off blade, and a support plate;

said blade and plate extending toward one another in vertically spaced planes and terminating in inner ends which are substantially aligned vertically; and a deflector pad secured to the lower face of said cut-off blade in the horizontal plane of said stripping lip;

said blade being operable during a dispensing stroke to slice through the lower end of a column of said material resting on said support plate so as to sever a bottom stratum of material therefrom;

said deflector pad being operable to deflect said lower stratum downwardly as it is thus severed, whereby to loosen it for dropping by gravity past the inner end of said support plate which recedes in unison with the advance of said blade;

said stripping lip extending substantially to the plane of the upper face of said support plate so as to strip therefrom the material resting thereon as said blade recedes in said dispensing stroke.

2. A dispenser as defined in claim 1, wherein said pad has on its advancing side a bevelled edge for effecting said deflecting action.

3. A dispenser as defined in claim 2, wherein said deflecting edge is contoured and positioned to substantially engage said stripping lip throughout the width of said support plate, at the end of said dispensing stroke.

4. A dispenser as defined in claim 3, wherein said hopper is a cylindrical tube having its lower end fixed to the top of said throat means;

said deflector pad being a circular disc having a conical, beveled, undercut edge; and said stripping lip being of semicircular configuration for substantially mating with said beveled edge at the end of said dispensing stroke.

5. A dispenser as defined in claim 1, wherein said pad has a thickness extending only a portion of the depth between the planes of said blade and plate.

6. A dispenser as defined in claim 1, wherein said pad has a thickness extending only a portion of the depth between the planes of said blade and plate; and wherein said stripping lip means comprises a center plate having an opening forming an intermediate part of said throat and a shallow rectangular recess extending tangently from transversely opposite sides of said opening to the opposite end of said plate and providing clearance space in which said deflector pad is movable during said dispensing stroke, the upper portion of said plate, defining the margin of said recess being of U-planform.

7. A dispenser as defined in claim 1, wherein said throat means comprises upper, intermediate and lower plates secured together in sandwich assembly, said stripping lip means being the intermediate plate, the lateral margins thereof being spaced inwardly from the lateral margins of said upper and lower plates, so as to define said intermediate ways;

said slide frame including longitudinal side bars slidable in said intermediate ways.

8. A dispenser as defined in claim 1, wherein said throat means is constituted by a sandwich assembly of plates comprising:

an intermediate plate embodying said stripping lip;

an upper plate having in the respective sides of its under face a pair of recesses receiving and locating the margins of said intermediate plate, and a pair of upwardly and inwardly stepped slideways to receive the margins of said cut-off blade; and a lower plate having in the respective sides of its upper face, slideways slidably receiving the margins of said support plate.

9. A dispenser as defined in claim 1, wherein said throat means is constituted by a sandwich assembly of plates comprising:

an intermediate plate embodying said stripping lip;

an upper plate having in the respective sides of its under face a pair of recesses receiving and locating the margins of said intermediate plate, and a pair of upwardly and inwardly stepped slideways to receive the margins of said cut-off blade; and a lower plate having in the respective sides of its upper face, slideways slidably receiving the margins of said support plate;

said slide frame including longitudinal side bars;

the lateral margins of said intermediate plate being spaced inwardly from the inner sides of said side bars; and a plurality of fasteners extending through said upper and lower plates and through the spaces between said intermediate plate and side bars, to secure said plates in assembly.

10. A dispenser as defined in claim 1, wherein said throat means comprises upper, intermediate and lower plates secured together in sandwich assembly, said stripping lip means being the intermediate plate;

said slide frame including longitudinal side bars slidable in said intermediate ways and being spaced outwardly from the side margins of said intermediate plate to define clearance slots; and releasable fasteners extending through said upper and lower plates and through said clearance slots;

said intermediate plate functioning as a measuring plate determining the dispensing volume of said dispenser, and being removable by loosening said fasteners, spreading said upper and lower plates apart, and then sliding said intermediate plate longitudinally out of said assembly, for replacement by a measuring plate of different thickness providing a different dispensing volume.

References Cited
UNITED STATES PATENTS

| | | | |
|---|---|---|---|
| 2,111,915 | 3/1938 | MacMillin | 222—447 |
| 3,105,620 | 10/1963 | Atkins et al. | 222—342 |

STANLEY TOLLBERG, Primary Examiner